United States Patent
Wyatt et al.

(10) Patent No.: US 10,189,451 B2
(45) Date of Patent: Jan. 29, 2019

(54) RETURN-TO-PARK SPRING

(71) Applicant: Ford Global Technologies, LLC, Dearborn, MI (US)

(72) Inventors: Susan Wyatt, Milford, MI (US); Todd Curtis Spaulding, Ann Arbor, MI (US); Zheng Liang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 14/995,464

(22) Filed: Jan. 14, 2016

(65) Prior Publication Data
US 2017/0203738 A1   Jul. 20, 2017

(51) Int. Cl.
| | |
|---|---|
| *B60T 1/00* | (2006.01) |
| *F16H 63/38* | (2006.01) |
| *F16H 63/34* | (2006.01) |
| *F16D 65/14* | (2006.01) |
| *F16D 125/58* | (2012.01) |

(52) U.S. Cl.
CPC .............. *B60T 1/005* (2013.01); *F16D 65/14* (2013.01); *F16H 63/3458* (2013.01); *F16H 63/38* (2013.01); *F16D 2125/582* (2013.01)

(58) Field of Classification Search
CPC ..... B60T 1/005; F16D 65/14; F16D 2125/582
See application file for complete search history.

(56) References Cited

U.S. PATENT DOCUMENTS

| | | | | |
|---|---|---|---|---|
| 1,431,929 A | * | 10/1922 | Bryant | B60C 27/12 152/219 |
| 2,624,376 A | * | 1/1953 | Leigh | B21F 35/00 140/103 |
| 3,767,180 A | * | 10/1973 | Kaiser | A47C 27/06 267/179 |
| 4,369,867 A | * | 1/1983 | Lemieux | B60T 1/005 188/31 |
| 4,633,992 A | | 1/1987 | Ishida | |
| 5,150,633 A | | 9/1992 | Hillgärtner | |
| 5,794,490 A | | 8/1998 | Papenhagen et al. | |
| 5,829,309 A | | 11/1998 | Wagner et al. | |
| 6,481,556 B1 | * | 11/2002 | Haupt | F16H 63/3491 188/31 |

(Continued)

FOREIGN PATENT DOCUMENTS

| | | | |
|---|---|---|---|
| JP | 5297923 | | 6/2013 |
| WO | WO2015151561 | * | 8/2015 |

*Primary Examiner* — Vishal R Sahni
(74) *Attorney, Agent, or Firm* — James Dottavio; Brooks Kushman, P.C.

(57) ABSTRACT

A parking mechanism in a vehicle is controlled to rotate, which engages and disengages a pawl with a spoke or gear of a wheel to selectively hold the wheel against rotation in park. A spring is connected to the parking mechanism at a first end, and is connected to the transmission housing or a stop block at a second end. The first end of the spring is a closed loop, such as a helix shape that extends over 360 degrees over a loop axis. The second end of the spring is open-ended, such as a hook. After attaching the first end of the spring to the park mechanism, but prior to attaching the second end, a valve assembly can be mounted as well as the stop block. After those components are assembled in place, the second end of the spring can simply hook into place.

18 Claims, 4 Drawing Sheets

(56) References Cited

U.S. PATENT DOCUMENTS

| | | | |
|---|---|---|---|
| 2015/0308571 A1* | 10/2015 | Wyatt | F16H 63/3491 |
| | | | 192/219.5 |
| 2016/0001751 A1* | 1/2016 | Takei | B60T 1/06 |
| | | | 188/31 |
| 2016/0341311 A1* | 11/2016 | Watanabe | F16H 63/3483 |
| 2017/0016535 A1* | 1/2017 | Tachibanada | F16H 61/12 |

* cited by examiner

RETURN-TO-PARK SPRING

TECHNICAL FIELD

This disclosure relates to the field of automatic transmissions for motor vehicles. More particularly, the disclosure pertains to a spring for a park mechanism.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is operating at a low speed, the transmission is usually operated at a high speed ratio such that it multiples the engine torque for improved acceleration. At high vehicle speed, operating the transmission at a low speed ratio permits an engine speed associated with quiet, fuel-efficient cruising.

These transmissions can also incorporate a park-by-wire system. In a park-by-wire system, a controller commands movement of a parking mechanism, engaging a parking pawl with an associated toothed gear of a wheel. Mechanical components, such as springs, can be implemented to bias the parking mechanism into either an engaged or disengaged state absent any commanded force on pawl from the controller. Assembly of springs can be cumbersome and awkward during the manufacturing process, especially if the spring is surrounded by other components with tight spacing.

SUMMARY

According to one embodiment, a transmission comprising a housing, and a park brake lever in the housing, rotatable about an axis, and having first, second, and third legs extending away from the axis. A valve assembly is configured to engage the first leg. A pawl is coupled to the second arm for engaging a parking brake gear. A spring has a closed-ended first end coupled to the third leg, and an open-ended second end coupled to the housing.

The first end may be in the shape of a helix, or a helix loop. The first end may include a rod that extends and loops about a loop axis by over 360 degrees.

According to another embodiment, a park mechanism comprises a lever rotatable about an axis and coupled to a valve assembly that is configured to apply hydraulic pressure to the lever. A stop block is adjacent to the valve assembly for limiting movement of the valve assembly. A spring has first and second end portions. The first end portion defines a closed loop coupled to the lever, and the second end portion defines a hook coupled to the stop block.

According to another embodiment, a method of assembling a parking brake mechanism is provided. The method includes coupling a closed-ended first end of a spring to a parking brake lever. Then, a valve assembly is assembled to or about the lever while the spring remains coupled at one end. Then, an open-ended second end of the spring is hooked through an aperture in a flange that extends from a transmission housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
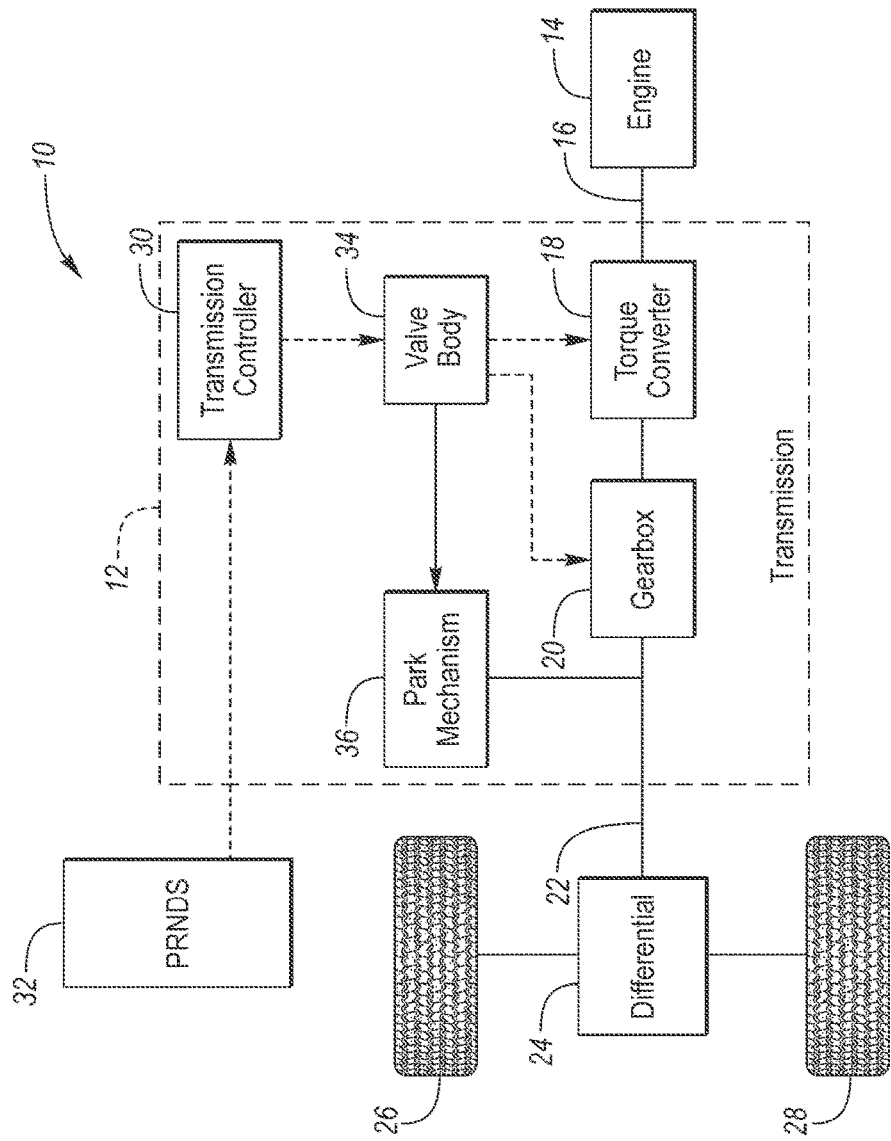
FIG. 1 is a schematic diagram of a powertrain of a vehicle having a park mechanism.

FIG. 1 illustrates a vehicle with a powertrain 10 having a transmission 12 that incorporates a park-by-wire system. The flow of mechanical power is illustrated by solid lines, while dashed lines indicate the flow of information signals. Power is generated by engine 14 and conveyed to a transmission input shaft 16. A torque converter 18 and gearbox 20 modify the speed and torque at which the power is delivered to match vehicle requirements while permitting engine 14 to run at a suitable crankshaft speed. Other types of transmissions may utilize other types of ratio manipulation devices. Driveshaft 22 transfers power from transmission 12 to differential 24. Differential 24 distributes the power between drive wheels 26 and 28 while allowing slight speed differences such as when turning a corner. Some transmissions, such as front wheel drive transaxles, may include the differential in the same housing with the gearbox and torque converter. In such transmissions, power transfer to the differential may utilize gears or chains as opposed to a driveshaft. In some vehicles, a transfer case may be interposed between the transmission and differential to transfer some power to additional wheels.

Torque converter 18 includes an impeller driven by the input shaft 16 which hydro-dynamically drives a turbine. Torque is transferred from the impeller to the turbine whenever the turbine is rotating slower than the impeller, including when the turbine is stationary. Torque converter 18 also includes a stator such that the torque exerted on the turbine may be a multiple of the torque exerted by the impeller on the input shaft. The torque converter may also include an actively controlled lock-up clutch to allow efficient transfer of torque without any speed difference between the impeller and the turbine. The gearbox may be a discrete ratio gearbox that selects is capable of establishing various power flow paths with various speed ratios by selectively engaging various combinations of clutches. Alternatively, the gearbox may include a continuously variable ratio mechanism.

Transmission controller 30 adjusts the state of transmission 12 based on various inputs, including vehicle speed measurements, driver torque demand as indicated by accelerator pedal position, and shift selector 32. The driver uses the shift selector to indicate the desire to move forwards (D) or backwards (R) for example. Controller 30 may adjust the state of the transmission by sending signals to valve body 34. In response to these signals, valve body 34 adjusts the pressure in hydraulic circuits to engage particular clutches, such as clutches within gearbox 20 and the torque converter lock-up clutch.

Park mechanism 36 is engaged in response to driver selection of park (P) via shift selector 32 in order to prevent vehicle movement when the vehicle is unoccupied. The park mechanism must be designed such that, once engaged, the system stays engaged without any vehicle power. In some vehicles, the park mechanism is mechanically linked to the shift selector 32. However, in a park-by-wire system, transmission controller 30 engages and disengages park mechanism 36 in response to an electrical signal from the shift selector 32. Controller 30 may control the park mechanism indirectly by sending electrical signals to valve body 34 that result in hydraulic or mechanical signals to the park mechanism 36.

Figure 2A:
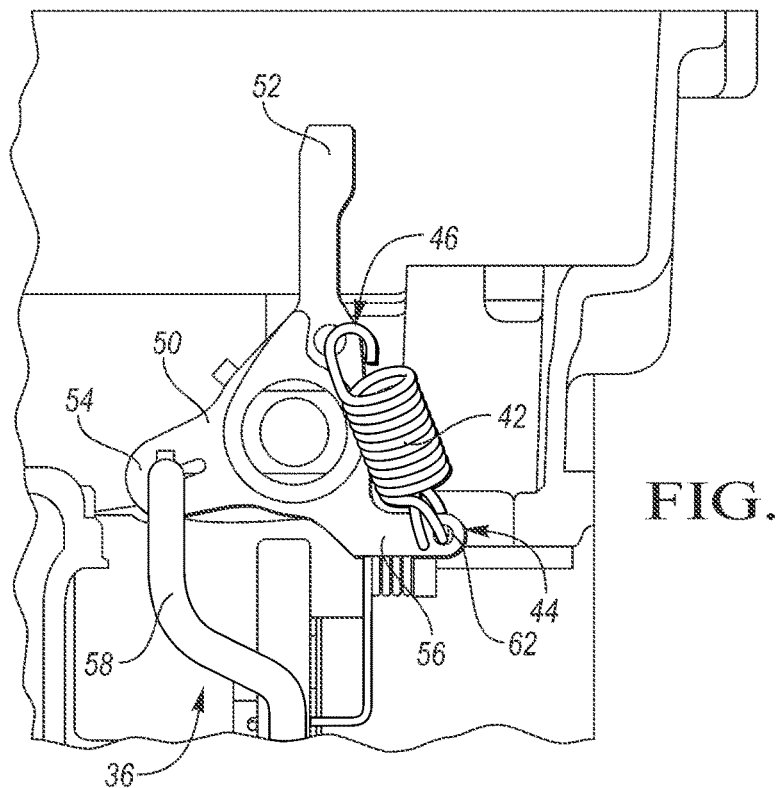
FIGS. 2A and 2B are front and top views, respectively, of the parking mechanism that is used to move and engage a parking pawl to a gear to place the vehicle in park.
Figure 2B:
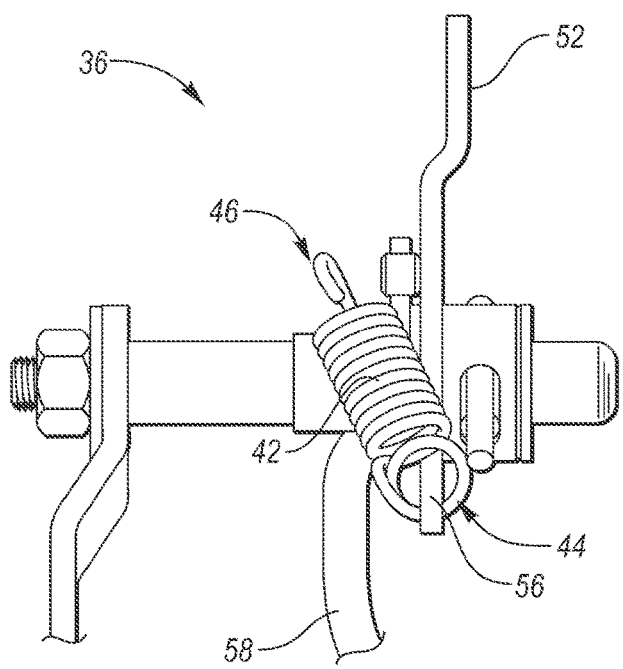
Figure 3:
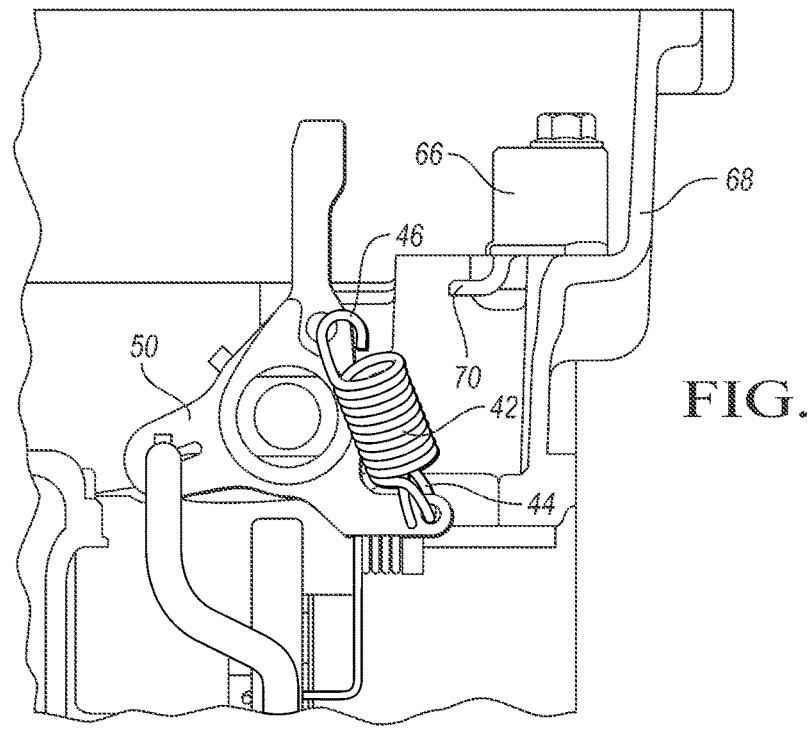
FIG. 3 is a front view of the parking mechanism, with a spring attached at one end and free at another end, and with a stop block attached.
Figure 4:
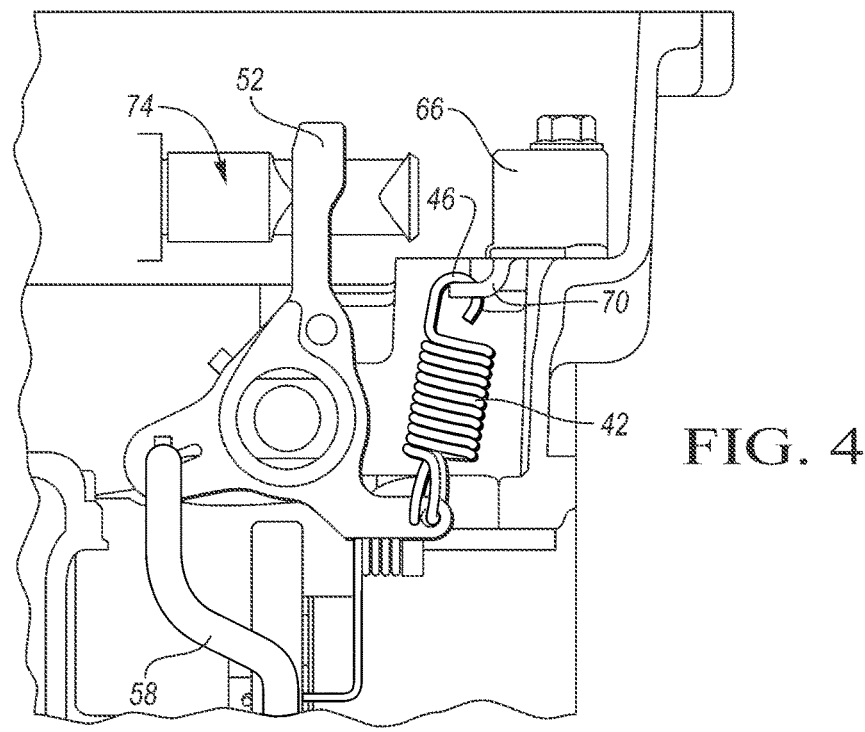
FIG. 4 is a front view of the parking mechanism now with a hydraulic valve assembly attached and the spring coupled to the stop block.

FIGS. 2-4 show a portion of the parking mechanism 36 that includes a valve, a lever assembly, a spring, and a stop block. The portion of the parking mechanism 36 shown in FIGS. 2-4 is suitable for the powertrain 10 of FIG. 1. The parking mechanism 36 can be part of a larger braking brake system that is not shown. As known in the art, parking brake systems can include mechanisms that allows for mechanical braking on the wheels while the vehicle is parked. For example, the parking brakes can include a member of the parking mechanism 36 being fixedly driveably connected to the driven vehicle wheels. Two elements are driveably connected when a power flow path is established between them such that rotation of one requires rotation of the other. For example, the parking brake system may include a park gear that is fixed to an output shaft of the transmission 12 which is fixed to the driveshaft 22. Driveshaft 22 is driveably connected to driven wheels 26 and 28 collectively (although it is possible for driveshaft 22 to rotate with one of the driven wheels being stationary due to action of the differential 24). In a front wheel drive transmission, there may be multiple shafts that are driveably connected to the driven wheels and therefore could park the park gear.

The parking brake system may also include a parking pawl mounted to the transmission case that is pivotable between an engaged position and a disengaged position. In the engaged position, a tooth of the parking pawl can interlock with teeth of a parking gear to prevent rotation of the parking gear, thereby preventing movement of one or more associated wheels. The system can also include a cam, a compression spring, such as those disclosed in U.S. patent application Ser. No. 14/797,205 which is hereby incorporated by reference.

The parking mechanism 36 shown in FIGS. 2-4 includes a lever 50 that is pivotable about a pivot axis. The lever 50 is indirectly mechanically coupled to the pawl that engages the parking gear to prevent rotation of the wheel. A spring 42 is also provided. The spring 42 is a return spring that biases the lever back to position that engages the parking gear. According to various embodiments of this disclosure, the spring 42 is a specially-design spring that allows the spring to be attached at one end while other components are assembled to the parking brake system, and then attached at the other end to complete the assembly.

FIGS. 2-4 are shown in sequential order during an assembly process, as will be described below. In FIGS. 2A-2B, the spring 42 is attached at a first end 44 and is free or not attached at a second end 46. In FIG. 3, a stop block is assembled while the spring remains attached at only one end. In FIG. 4, a valve assembly is attached, and thereafter the spring can be hooked to the stop block to complete the assembly.

FIG. 2A shows the parking mechanism from a front view, while FIG. 2B shows the parking mechanism from beneath (i.e., from below the mechanism 36 when in its orientation in FIG. 2A). The parking mechanism includes a lever 50 that is pivotable about a pivot point, or rotatable about an axis. In one embodiment, the lever 50 includes multiple legs 52, 54, 56 for attachment to different components. The legs can be formed of the same material, or can be attached or secured to one another via bolting, welding, etc. One leg 52 of the lever 50 is located within a later-attached valve assembly, as will be described below. Another leg 54 of the lever 50 is coupled to an arm 58 that either directly or indirectly engages the pawl for locking with the gear of the parking brake system. A third leg 56 serves as an attachment point for the first end 44 of the spring 42.

The first end 44 of the spring 42 is provided with structure to enable a secured engagement with the leg 56 of the lever 50. The structure of the spring provides a better attachment as compared to a simple hook. For example, in embodiments shown in the Figures, the first end 44 of the spring 42 is provided with a helix loop. In this helix loop, the first end 44 has a helix shape. The metal of the spring may be shaped such that it spirals back into itself. This shape allows an assembly worker to attach the end of the metal through a hole 62 in lever 50, and twist the spring around the lever in a motion that is similar to putting keys on a key chain. In other embodiments, the first end 44 of the spring 42 is provided with a clasp or other similar structure that provides a semi- or fully-permanent engagement with the lever 50 at the hole 62. In these and other various embodiments, the first end 44 is rotatable coupled to the lever 50 through the hole 62 but not with a simple hook or open-ended loop such that the spring is able to fully rotate 360 degrees about the lever 50 at one contact region on the lever 50 without becoming disconnected from the lever 50. This provides a more secure engagement between the spring 42 and the lever 50 than an open loop, such as the open loop of the second end 46 of the spring.

Referring to FIG. 3, once the first end 44 of the spring 42 is coupled to the lever 50, and while the second end remains free and uncoupled, a stop block 66 is mounted to a transmission housing 68. The stop block 66 is positioned in line with a path of movement of a valve assembly, which is assembled later as shown in FIG. 4. The stop block 66 includes a flange 70 extending therefrom. The flange 70 defines an aperture therein to serve as an attachment point for the second end 46 of the spring. The flange 70 and the stop block 66 can, when mounted thereto, be considered part of the transmission housing 68.

Referring to FIG. 4, once the stop block 66 is assembled, a valve assembly 74 is assembled as well. The valve assembly is assembled to or about the leg 52 of the lever 50. When a parking brake is desired, the valve assembly 74 can provide a force via hydraulic power to the leg 52 of the lever 50 to cause the lever 50 to rotate against the force of the spring 42. The stop block 66 is positioned in-line with the path of movement of the valve assembly 74 to limit the movement of the valve assembly 74. All throughout the assembly of the stop block 66 and the valve assembly 74, the spring 42 can remain attached at only the first end 44. The closed-loop nature of the first end allows the spring to rotate out of the way of any parts being assembled while still remaining attached to the lever 50. After the valve assembly 74 is assembled, the spring 42 can finally be hooked to the flange 70 at the second end 46 of the spring.

In the embodiments described above, the spring 42 can be either an extension (i.e., tension) spring or a compression spring. In one embodiment, the spring 42 is an extension spring that biases the lever 50 counter-clockwise. As the lever 50 rotates or pivots clockwise in the view shown in FIG. 2A to release the parking brake, leg 52 is moved by the hydraulic valve 74 and the arm 58 translates to disengage the parking brake system. The spring 42, being an extension spring, biases the lever 50 counter-clockwise to return to park. Thus, the spring 42 can be referred to as a return-to-park spring. In another embodiment, the spring 42 is a compression spring that biases the lever 50 to turn counter-clockwise.

Figure 5A:
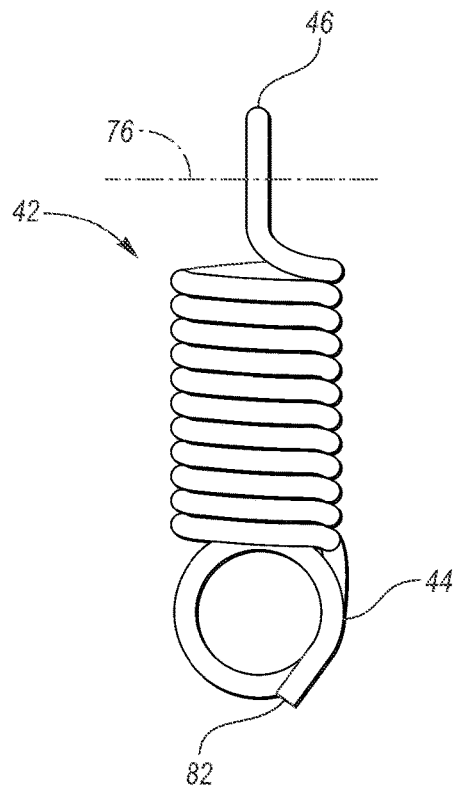
FIGS. 5A, 5B, and 5C are side, front, and bottom views, respectively, of the spring of FIGS. 2-4.
Figure 5B:
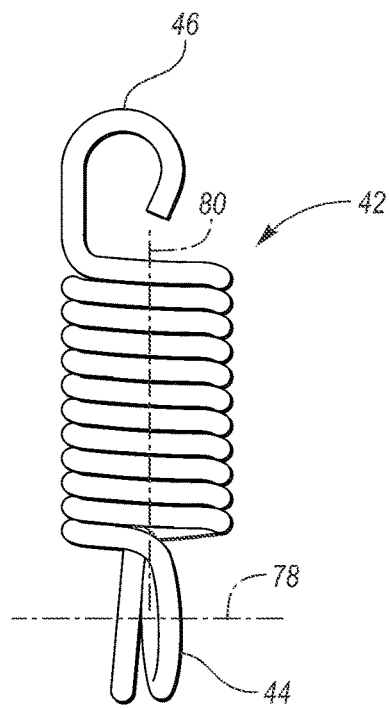
Figure 5C:
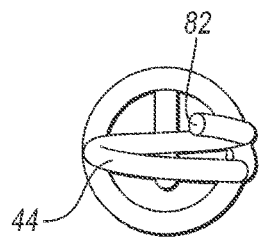

FIGS. 5A, 5B, and 5C show different views of one example of the spring 42. The second end 46 of the spring 42 can be an open-ended hook, for example. The hook extends about a hook axis 76, but not completely 360 degrees about the axis 76 so that the second end 46 takes the form of a hook. In contrast, the first end 44 of the spring 42 is a closed-ended loop in that it extends at least 360 degrees about a loop axis 78. The loop axis 78 extends generally perpendicular to a spring axis 80 that extends through the central part of the main body of the spring.

A free end 82 of the loop at the first end 44 is provided. An operator can feed the free end 82 through the hole 62 in the lever 50 and spin the spring 42 about the hole 62 over 360 degrees to attach the spring to the lever. In one embodiment, a portion of the spring that includes the free end can have a reduced diameter than the remainder of the spring to facilitate entry of the free end 82 into the hole in the lever 50.

The first end 44 of the spring can be considered closed-ended, as it defines a loop of metal that extends over 360 degrees about a loop axis 78. In contrast, the second end 46 of the spring can be considered open-ended, as the metal does not extend 360 degrees and instead takes the shape of a hook or the like.

The spring of this disclosure increases production and improves the ease of assembly. One end of the spring can be connected, while the other end remains free until components of the parking mechanism can be installed and assembled. This allows an assembly worker to keep the spring 42 attached to the parking mechanism 36 during assembly, but not entirely attached on both ends such that it would restrict movement of the lever 50 during assembly of surrounding parts. Due to assembly requirements or packaging concerns, the spring 42 may be required to be assembled prior to other components of the parking mechanism 36. Previous designs and implementations of the spring impaired work flow and throughput. For example, if the spring were attached at one end during assembly, it may have easily disconnected and fallen away from the assembly. If a worker were to assemble both ends of the spring before assembling any other components, the lever 50 may have been restricted in movement, making for a difficult assembly. The spring 42 of this disclosure combats these problems by allowing one end to be securely attached without a risk that the spring would detach entirely during assembly. The second end 46 can then be attached at a later time during assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A transmission comprising:
   a housing;
   a valve assembly and a stop block each disposed on the housing;
   a park brake lever in the housing, rotatable about an axis, and having first, second, and third legs extending away from the axis wherein the first leg is disposed between the valve assembly and the stop block;
   a pawl coupled to the second leg for engaging a parking brake gear; and
   a spring having a closed-ended first end coupled to the third leg, and an open-ended second end coupled to the housing to bias the first leg towards the valve assembly.

2. The transmission of claim 1, wherein the first end is in a shape of a helix loop.

3. The transmission of claim 2, wherein the first end of the spring includes a metal rod that extends over 360 degrees about a loop axis of the helix loop.

4. The transmission of claim 1, wherein the stop block is mechanically fixed to the housing and configured to prevent movement of the valve assembly past the stop.

5. A park mechanism comprising:
   a valve assembly disposed on a housing;
   a stop block provided with a flange adjacent to the valve assembly;
   a lever rotatable about an axis, disposed on the housing, including a first arm disposed between the valve assembly and the stop block; and
   a spring having a first end portion defining a closed loop coupled to the lever, and a second end portion defining a hook coupled to the flange.

6. The park mechanism of claim 5, wherein the closed loop is a helix-shaped loop.

7. The park mechanism of claim 6, wherein the first end portion of the spring includes a metal rod that extends at least 360 degrees about a loop axis of the helix-shaped loop.

8. The park mechanism of claim 7, wherein the helix-shaped loop defines an inner surface facing an interior of the helix-shaped loop, and wherein the inner surface extends at least 360 degrees about the loop axis.

9. The park mechanism of claim 5, wherein the spring defines a central spring axis, and the closed loop defines a loop axis, wherein the loop axis extends generally transverse to the spring axis.

10. The park mechanism of claim 5, wherein the closed loop extends at least 360 degrees about a loop axis.

11. The park mechanism of claim 5, wherein the hook extends less than 360 degrees about a hook axis.

12. The park mechanism of claim 5, wherein the stop block is mechanically fixed to the housing.

13. The transmission of claim 4, wherein the second end is directly connected to a flange extending from the stop block.

14. A transmission comprising:
 a housing;
 a valve assembly and a stop block each coupled to the housing;
 a lever including first and second arms wherein the first arm is disposed between the valve assembly and the stop block; and
 a spring having a closed-end first end coupled to the second arm and an open-ended second end coupled a flange extending from the stop block to bias the first arm towards the valve assembly.

15. The transmission of claim 14, wherein the first end is in a shape of a helix loop.

16. The transmission of claim 15, wherein the first end of the spring includes a metal rod that extends over 360 degrees about a loop axis of the helix loop.

17. The transmission of claim 14, wherein the stop block is mechanically fixed to the housing and configured to prevent movement of the valve assembly past the stop.

18. The transmission of claim 17, wherein the second end is directly connected to a flange extending from the stop block.

* * * * *